(12) United States Patent
Cary

(10) Patent No.: US 9,383,015 B2
(45) Date of Patent: Jul. 5, 2016

(54) FLUID END HAVING SPHERICAL CROSS-BORE INTERSECTION

(71) Applicant: GARDNER DENVER, INC., Wayne, PA (US)

(72) Inventor: Paul Douglas Cary, Broken Arrow, OK (US)

(73) Assignee: GARDNER DENVER, INC., Wayne, PA (US)

( * ) Notice: Subject to any disclaimer, the term of this patent is extended or adjusted under 35 U.S.C. 154(b) by 451 days.

(21) Appl. No.: 13/899,301

(22) Filed: May 21, 2013

(65) Prior Publication Data

US 2014/0345452 A1    Nov. 27, 2014

(51) Int. Cl.
*F04B 53/16*    (2006.01)
*F16J 10/02*    (2006.01)
*F16L 41/03*    (2006.01)

(52) U.S. Cl.
CPC . *F16J 10/02* (2013.01); *F16L 41/03* (2013.01)

(58) Field of Classification Search
CPC ....... F16J 10/02; F04B 53/162; F04B 53/007; F16L 41/03
USPC .......................................... 92/169.1; 417/568
See application file for complete search history.

(56) References Cited

U.S. PATENT DOCUMENTS

| | | |
|---|---|---|
| 6,544,012 B1 | 4/2003 | Blume |
| 6,910,871 B1 | 6/2005 | Blume |
| 7,484,452 B2 | 2/2009 | Baxter et al. |
| 7,513,759 B1 * | 4/2009 | Blume .......................... 417/568 |
| 2008/0080994 A1 * | 4/2008 | Gambier et al. .............. 417/534 |
| 2008/0152523 A1 | 6/2008 | Jensen et al. |

OTHER PUBLICATIONS

Fig. 1A and Fig. 1B of present application as described in background are prior art.

* cited by examiner

*Primary Examiner* — Nathaniel Wiehe
*Assistant Examiner* — Abiy Teka
(74) *Attorney, Agent, or Firm* — Michael Best & Friedrich LLP

(57) ABSTRACT

A fluid end of a high-pressure pump having a power end bore, a discharge bore, a suction bore, an access bore, and a cross-bore intersection formed in portions of the fluid end is provided. A transitional open area opens into the cross-bore intersection from the power end bore; a transitional open area opens into the cross-bore intersection from the access bore; a transitional open area opens into the cross-bore intersection from the suction bore; and a transitional open area opens into the cross-bore intersection from the discharge bore. A spherical geometry is created in the cross-bore intersection. A spherical surface forms an outer boundary of the cross-bore intersection.

22 Claims, 8 Drawing Sheets

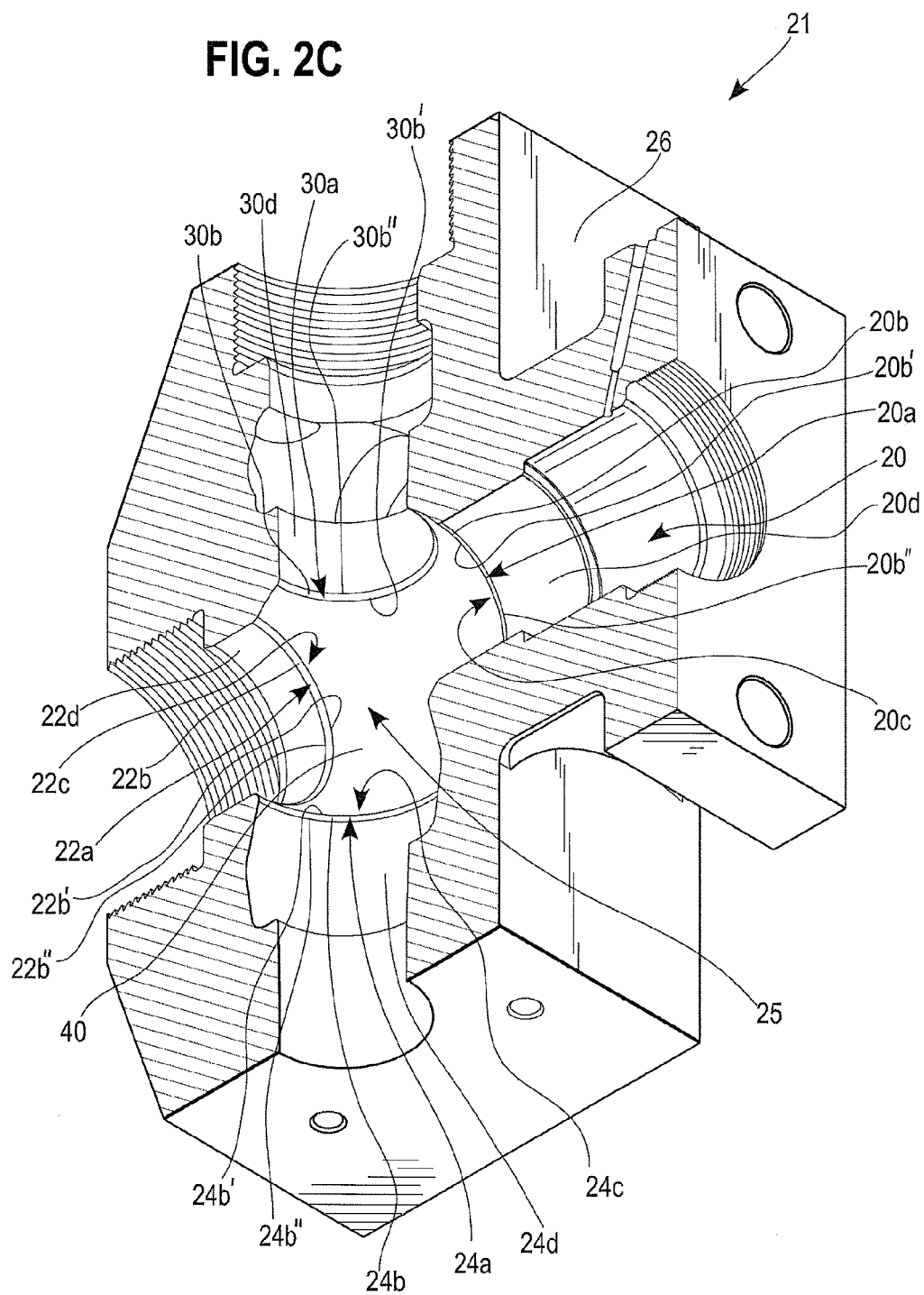

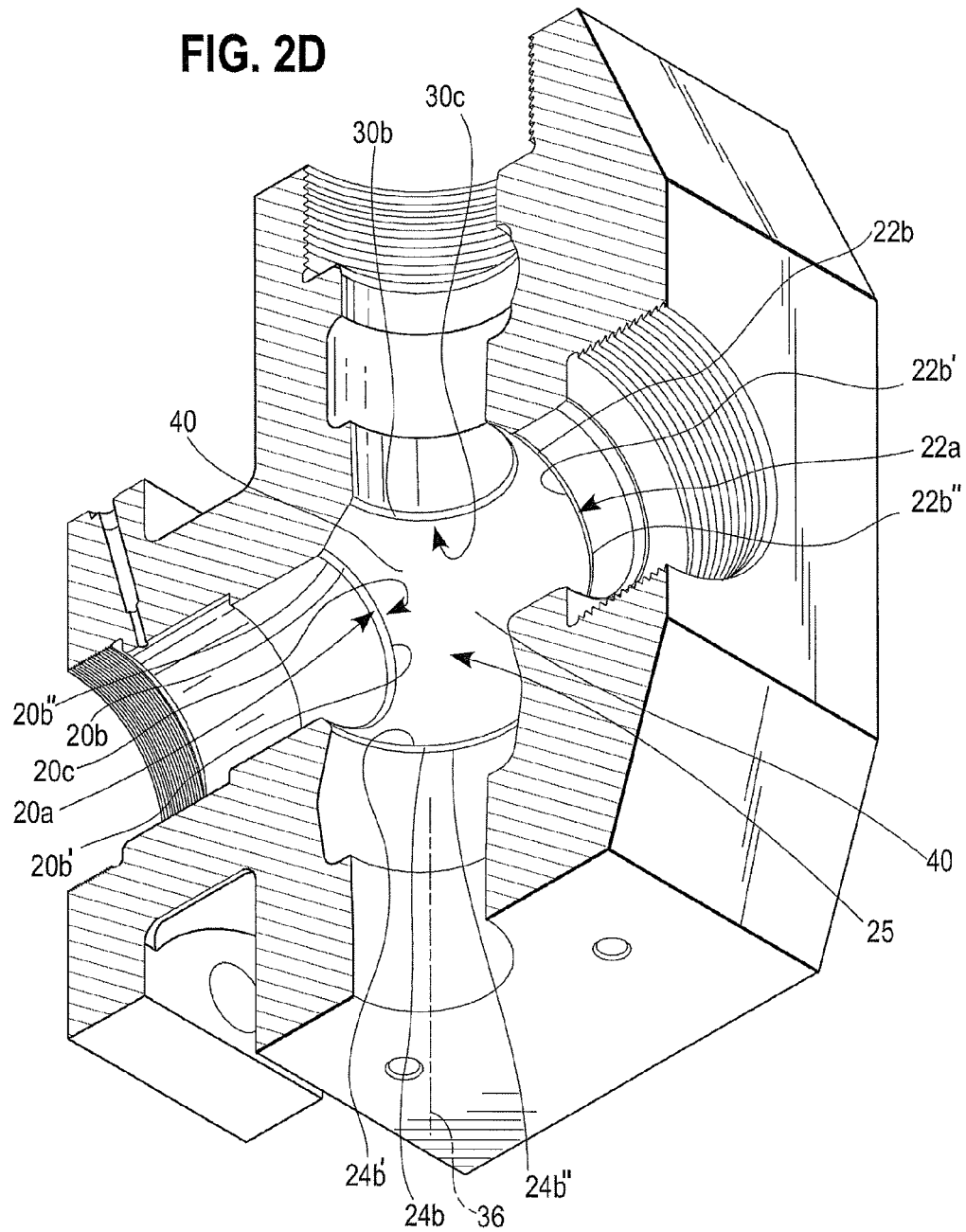

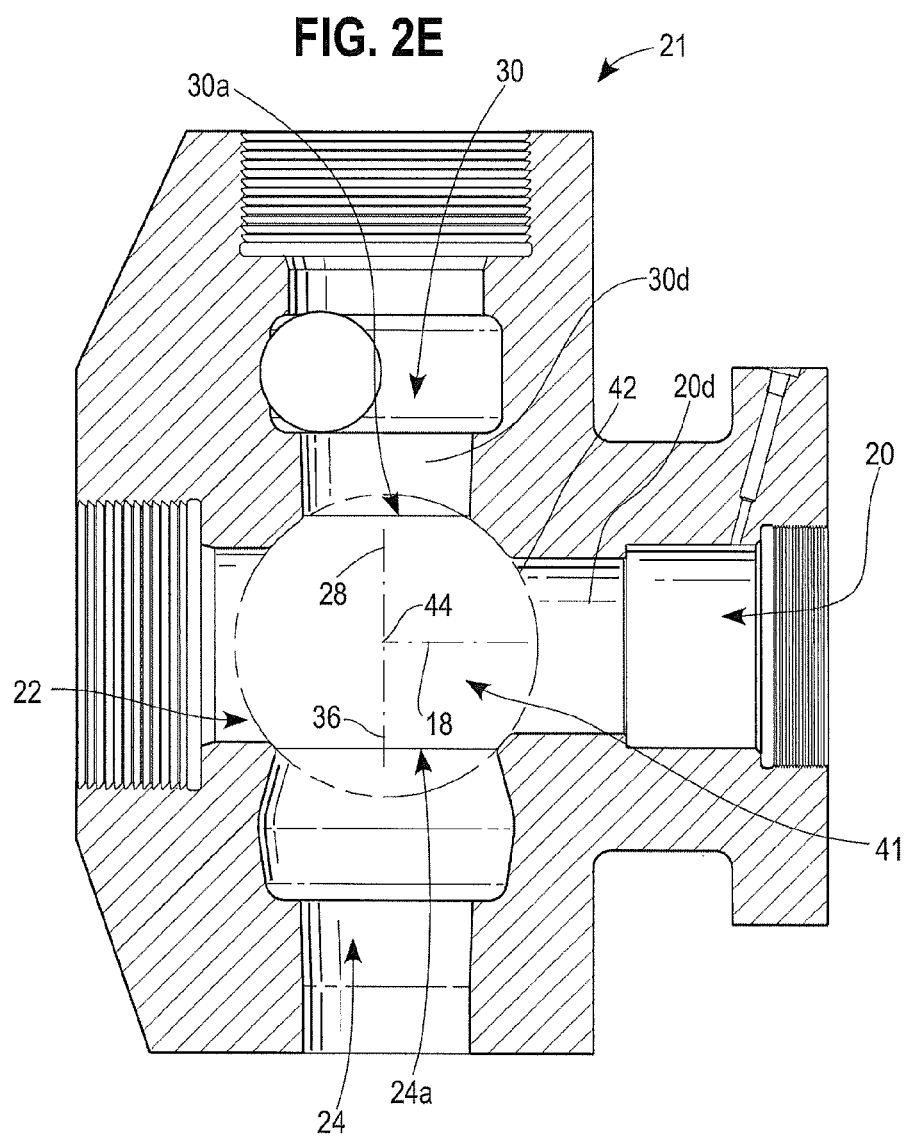

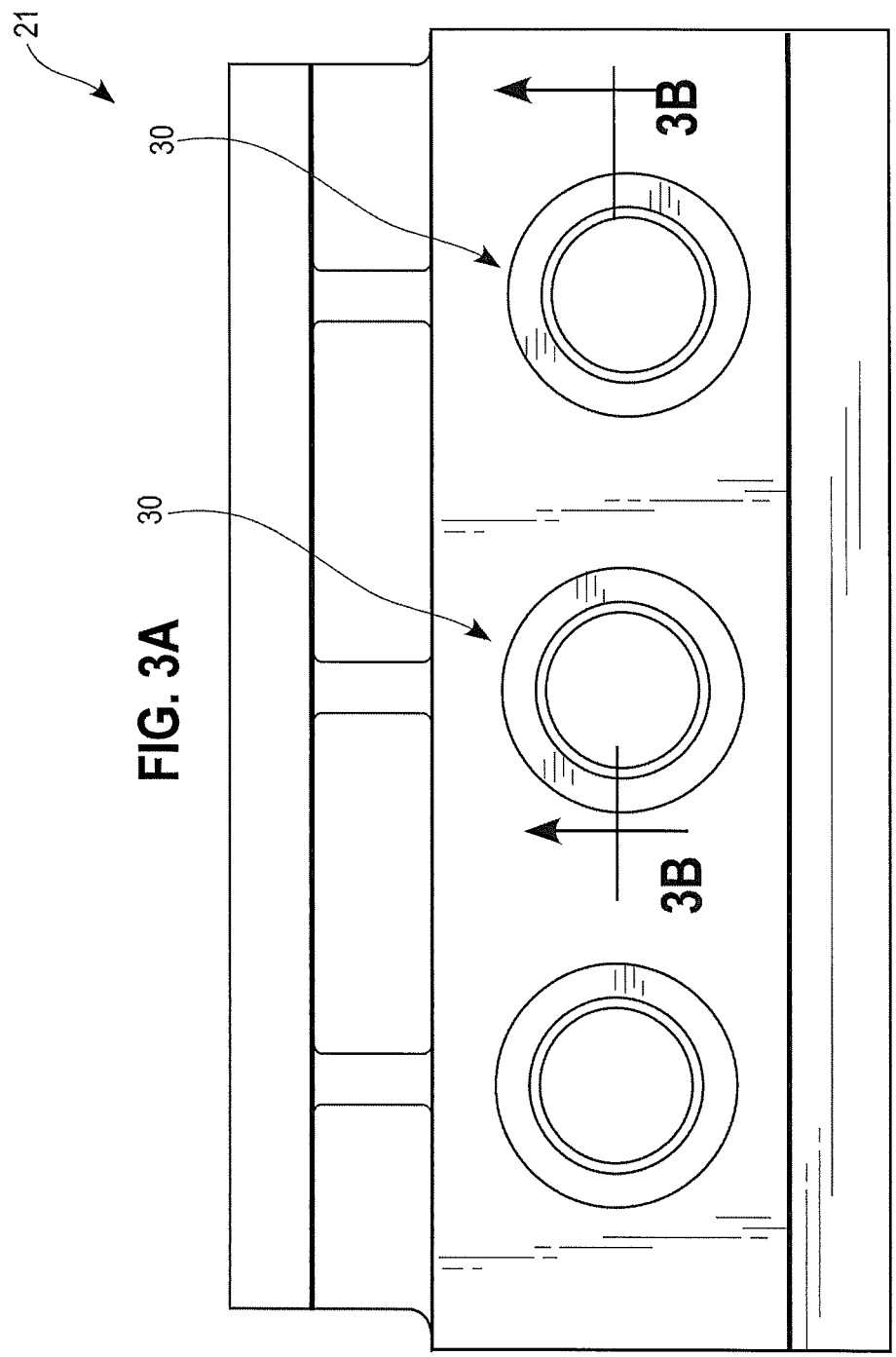

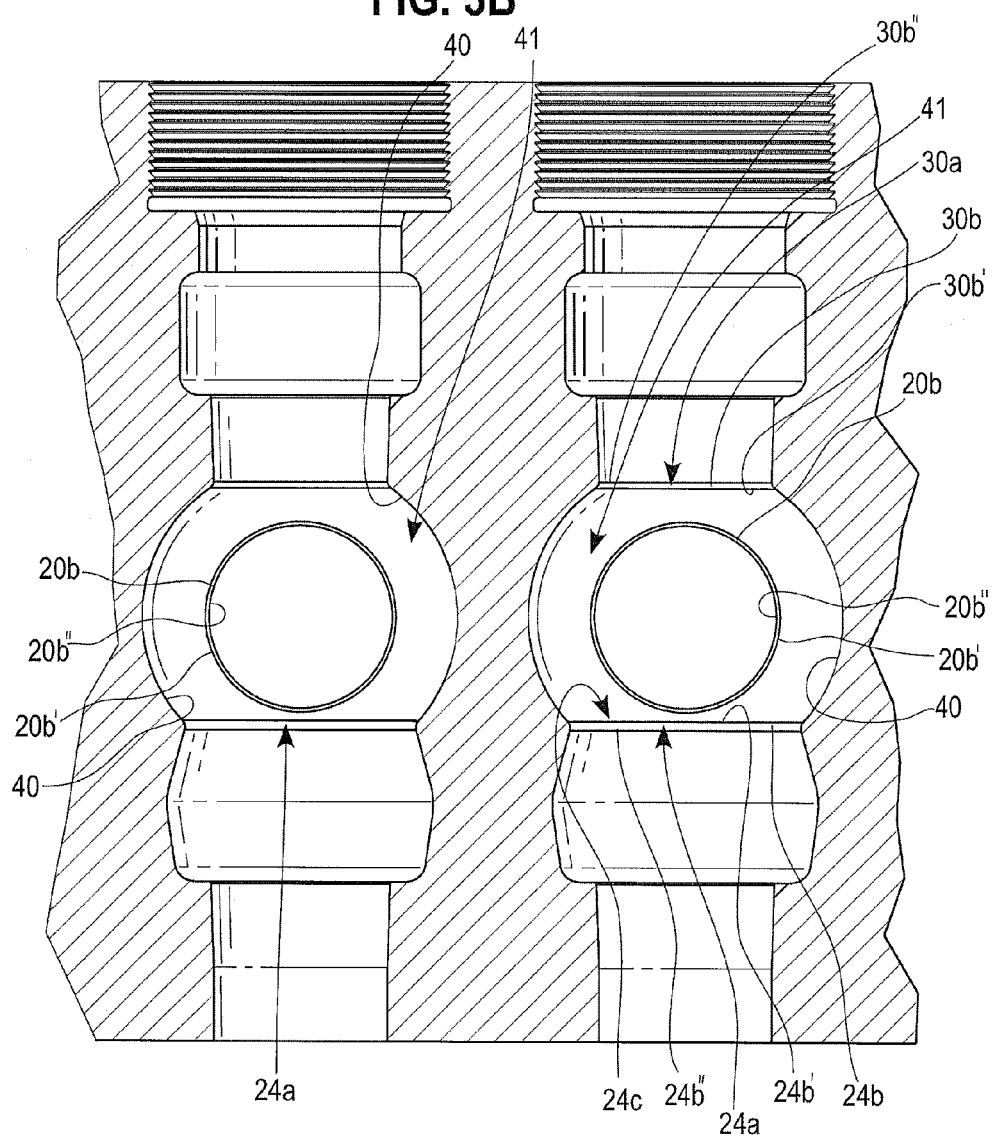

US 9,383,015 B2

FLUID END HAVING SPHERICAL CROSS-BORE INTERSECTION

FIELD

The present disclosure relates in general to reciprocating pumps. More particularly, the present disclosure relates to the cross-bore intersection geometry in a reciprocating pump and where transitional open areas open from the access bore and the power end bore into the cross-bore intersection.

BACKGROUND

FIG. 1B shows a cross-sectional view of a right angle fluid end for use in a typical pump known from the prior art. The section is taken along view line A-A of FIG. 1A. The cross-bore intersection of the fluid end is commonly subjected to high stresses. The fluid end 10 shown in FIGS. 1A and 1B has a power end bore 12, suction bore 13, and discharge bore 14. The fluid end 10 also has a valve cover bore 15 which can also be called an access bore. Transitional surface open areas 12a, 13a, 14a, and 15a open into the cross-bore intersection 16. Each of the transition open areas 12a, 13a, 14a, and 15a are delimited by transition surfaces 12b, 13b, 14b and 15b. As seen in FIG. 1B, the transition surfaces 12b and 15b have intersecting edges and form non-uniform curves.

U.S. Pat. No. 6,910,871 to Blume discloses valve guide and spring retainer assemblies for use in plunger pump housings that incorporate features for stress relief. Blume introduces large chamfers in the pump housing. The cross-bore intersection has an elongated cross-section.

U.S. Pat. No. 6,544,012 to Blume discloses a Y-block fluid section of a plunger pump having a bore which is transversely elongated at its intersection with suction and discharge bores to provide stress relief and reduction in housing weight. A spoked, ring valve spring retainer further reduces stress near the bore intersection and allows use of a top stem guided suction valve.

SUMMARY

An embodiment of the invention concerns a fluid end of a pump. The fluid end has a power end bore formed in a portion of the fluid end. The power end bore has a long axis. A first transitional open area opens into a cross-bore intersection from the power end bore. The transitional open area is axially opposite, relative to the power end bore long axis, an entry open end opening into the power end bore through a portion of an external surface of the fluid end. A first transitional surface delimits in the radial direction, relative to the power end bore long axis, the first transitional open area. The cross-bore intersection is formed in a portion of the fluid end.

A discharge bore is formed in a portion of said fluid end. The discharge bore has a long axis. A second transitional open area opens into the cross-bore intersection from the discharge bore. The second transitional open area is axially opposite, relative to the discharge bore long axis, an entry open end opening into the discharge bore through a portion of the external surface of the fluid end. A second transitional surface delimits, in the radial direction, relative to the discharge bore long axis, the second transitional open area;

A suction bore is formed in a portion of the fluid end. The suction bore has a long axis. A third transitional open area opens into the cross-bore intersection from the suction bore. The third transitional open area is axially opposite, relative to the suction bore long axis, an entry open end opening into the suction bore through a portion of the external surface of the fluid end. A third transitional surface delimits in the radial direction, relative to the suction bore long axis, the third transitional open area.

An internal surface delimits an outer boundary of the cross-bore intersection, and an open space is formed within said outer boundary. The internal surface has a spherical geometry conforming to an outline of a sphere. The sphere has a center point in the cross-bore intersection. The long axis of the discharge bore extends through the transitional open area of said suction bore.

The embodiment of the invention can further include an access bore formed in a portion of the fluid end. The axis bore has a long axis. A fourth transitional open area opens into the cross-bore intersection from the access bore. The transitional open area is axially opposite, relative to the access bore long axis, an entry open end opening into the access bore through a portion of the external surface of the fluid end. A fourth transitional surface delimits, in the radial direction, relative to the access bore long axis, the fourth transitional open area.

The embodiment of the invention can yet further include the first transition surface and the fourth transition surface each forming and tracing a circular path. Each circular path completely lies in a single respective plane. The plane associated with the circular path of the first transition surface is perpendicular to the power end bore long axis. The plane associated with the circular path of the fourth transition surface is perpendicular to the access bore long axis. The first transition surface and the fourth transition surface are each delimited, in a direction going towards the cross-bore intersection, from the respective transitional open area which they delimit, by a respective first edge. Each first edge forms and traces a circular and continuous, path. Each path lies completely in a single plane. The plane associated with the edge of the first transition surface is perpendicular to the power end bore long axis and plane associated with the edge of the fourth transition surface is perpendicular to the access bore long axis.

BRIEF DESCRIPTION OF THE DRAWINGS

FIG. 2C is the same as the sectional view of the fluid end shown in FIG. 2A except the view has been rotated.

FIG. 2D is the same as the sectional view of the fluid end shown in FIG. 2B except the view has been rotated.

FIG. 2E is a plan view of the fluid end of FIG. 2A taken along the same section as FIG. 2A.

FIG. 3A is a schematic simplified plan view of the entire fluid end of the fluid end shown in FIG. 2A looking into the discharge bores of the fluid end.

FIG. 3B is a partial sectional view of the fluid end shown in FIG. 3A taken along view line labeled 3B-3B in FIG. 3A.

DETAILED DISCLOSURE

Figure 1A:
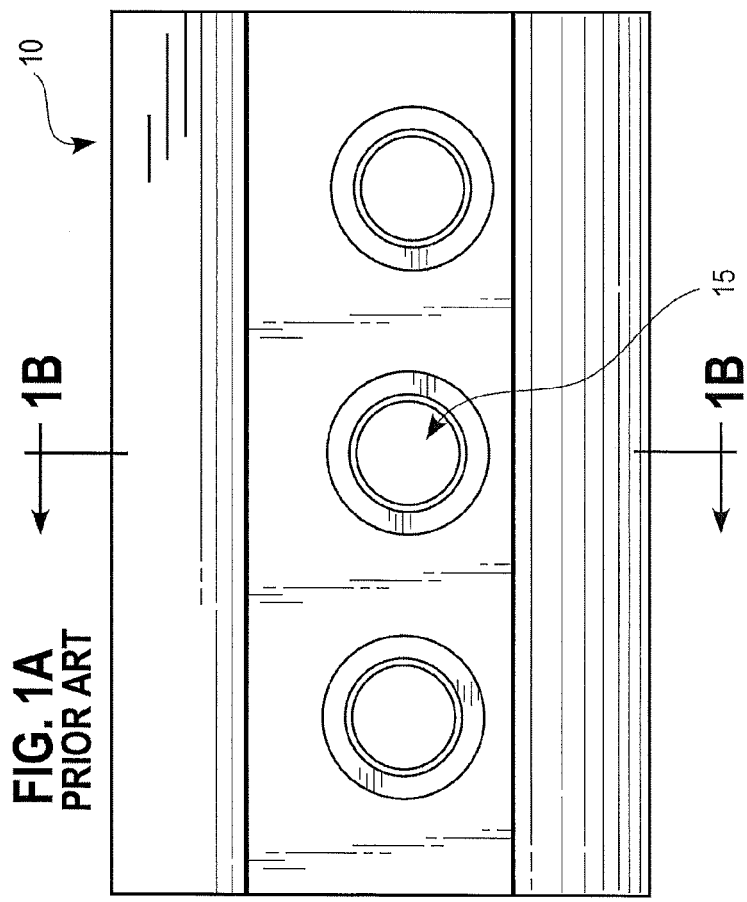
FIG. 1A is a plan view of a conventional triplex fluid end looking into the access bores of the fluid end.
Figure 1B:
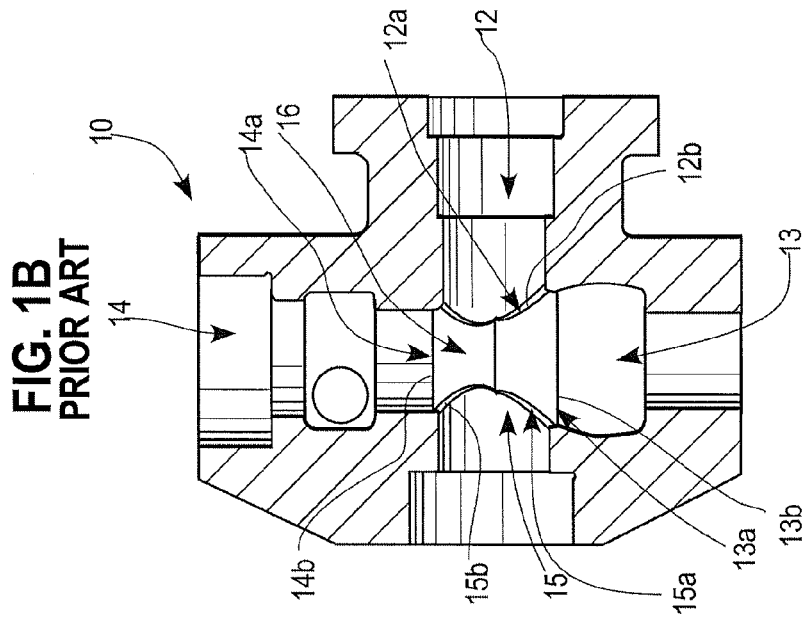
FIG. 1B is a sectional view of the fluid end shown in FIG. 1A taken along view line 1B-1B of FIG. 1A.

While embodiments of this invention can take many different forms, specific embodiments thereof are shown in the drawings and will be described herein in detail with the understanding that the present disclosure is to be considered as an exemplification of the principles of the invention, and is not intended to limit the invention to the specific embodiment illustrated.

Figure 2A:
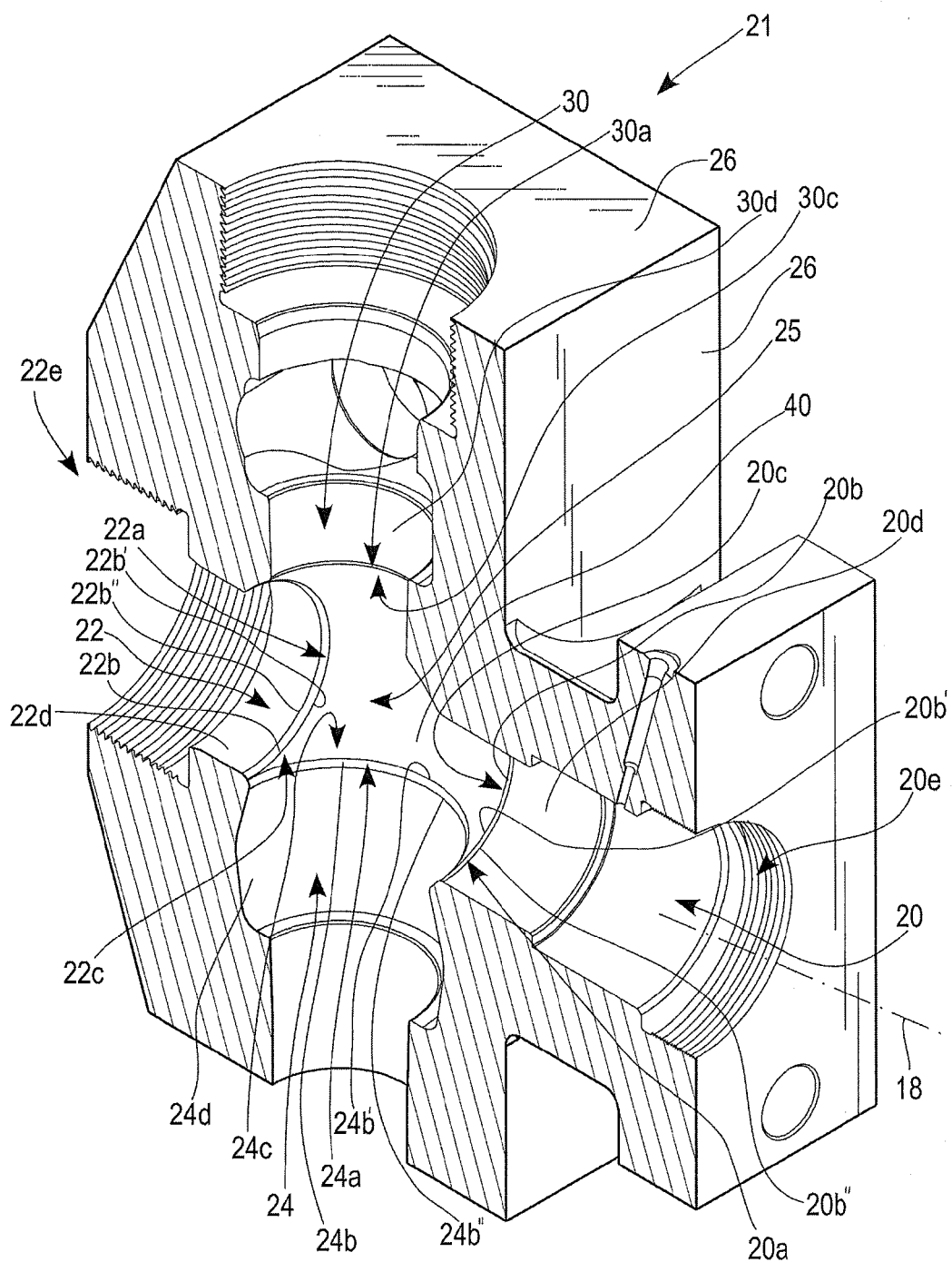
FIG. 2A is an isometric sectional view of a fluid end of a plunger pump of the present invention showing suction, power end, access and discharge bores of a plunger pump embodying the invention where the section is parallel to the long axis of the power end bore, the long axis of the suction bore, and the long axis of the discharge bore.

FIG. 2A shows a fluid end of a plunger pump embodying the present invention. The fluid end 21 has a power end bore 20 which in this case is a bore for a plunger and thus the bore can be called a plunger bore 20. FIG. 2A also shows a valve cover bore 22 which can also be called an access bore, a suction bore 24, and a discharge bore 30. A transitional open area 20a opens into the cross-bore intersection 25 from bore 20; a transitional open area 22a opens into the cross-bore intersection 25 from bore 22; a transitional open area 24a opens into the cross-bore intersection 25 from bore 24; and a transitional open area 30a opens into the cross-bore intersection 25 from bore 30. The cross-bore intersection 25 can also be called a cross-bore 25. The cross-bore intersection 25 includes an open space 41. The cross-bore intersection 25 has a spherical geometry.

A transition surface 22b delimits in the radial direction, relative to long axis 34 of bore 22, transition open area 22a. Transition surface 22b is axially between, relative to long axis 34, cylindrical counter bore 22d and a portion of internal surface 40. Internal surface 40 delimits an outer boundary of cross-bore intersection 25. A transition surface 20b, delimits in the radial direction, relative to long axis 18 of bore 20, transition open area 20a. Transition surface 20b is axially between, relative to long axis 18, cylindrical counter bore 20d and a portion of surface 40. The transition surface 22b circumscribes long axis 34 of bore 22, and the transition surface 20b circumscribes long axis 18 of bore 20. Each transition surface 20b, 22b is circumferential and continuous and forms and traces a circular path.

Transition surface 22b is delimited in a direction going towards the cross-bore intersection 25 from the transition open area 22a, by an edge 22b'. The edge 22b' is at an end 22c, of transition open area 22a. The end 22c of the transition open area 22a delimits the opening into the cross bore intersection 25 going in the axial direction, relative to long axis 34, from the transition open area 22a towards the cross-bore intersection 25. Transition surface 20b is delimited in a direction going towards cross-bore 25 intersection from the transition open area 20a, by an edge 20b'. The edge 20b' is at an end 20c of transition open area 20a. The end 20c of the transition open area 20a delimits the opening into the cross bore intersection 25 going in the axial direction, relative to long axis 18, from the transition open area 20a towards cross-bore intersection 25. These spherical and circular geometries, as explained in more detail below, are easier to manufacture than those in the prior art.

In more detail, the end 22c is as close as possible, in the axial direction, relative to the long axis 34, to the cross-bore intersection 25. The transition open area 22a is axially opposite an entry open end 22e opening into the access bore 22 through a portion of an external surface 26 of the fluid end 21. The path formed by transition surface 22b is continuous and circumscribes long axis 34. The circular path formed by the transition surface 22b completely lies in a single plane wherein the plane is perpendicular to the long axis 34. The circular path is thus planar. The transition surface is delimited, in a direction going towards entry open end 22e from the transition open area 22a, by edge 22b''. The edge 22b'' forms an end of bore 22 which opens into transition open area 22a. The transition surface 22b, between edges 22b' and 22b'', going in the direction from edge 22b'' towards edge 22b', is rounded and convex. The transition surface could be chamfered in which case it would be conical. The transition surface is uniform. It has a constant and continuous width measured as the axial distance, relative to long axis 34, between edges 22b'' and 22b'. It has a constant and continuous height measured as the radial distance from edge 22b'' to a line parallel to long axis 34 and the line intersecting a peak of the rounded surface 22b. The edges 22b' and 22b'' are parallel to each other. Each edge 22b' and 22b'' respectively is circumferential, continuous, and circumscribes long axis 34. Each edge also respectively forms and traces a circular and continuous path. The paths each lie completely in a respective plane. The planes in which each edge 22b', 22b'' lie are also perpendicular to axis 34. The paths formed by edges 22b', 22b'' are thus planar. The edge 22b' circumscribes end 22c. The edge 22b' is at the place where surface 22b joins a portion of surface 40 forming the cross-bore intersection outer boundary. The edge 22b' is the last edge crossed along a path starting in access bore 22 and ending once the path enters the cross-bore intersection 25. The direction of the path is from the access bore towards the cross-bore intersection 25. Similarly the edge 22b' is the first edge crossed along a path starting in the cross-bore intersection 25 and ending in the access bore 22. The direction of the path is towards the bore 22 from cross-bore intersection 25. The edge 22b' is the last edge, going from the access bore towards the cross-bore intersection, which is between cross-bore intersection 25 and the access bore 22. The edge 22b'' is at the place where cylindrical counter bore surface 22d joins transition surface 22b. The cylindrical counter bore surface 22d delimits the access bore 22 in a radial direction relative to the long axis 34. The circumferential nature of the surface 22b and edges 22b', 22b'' can best be seen in FIGS. 2A, 2C and 2E.

Figure 2B:
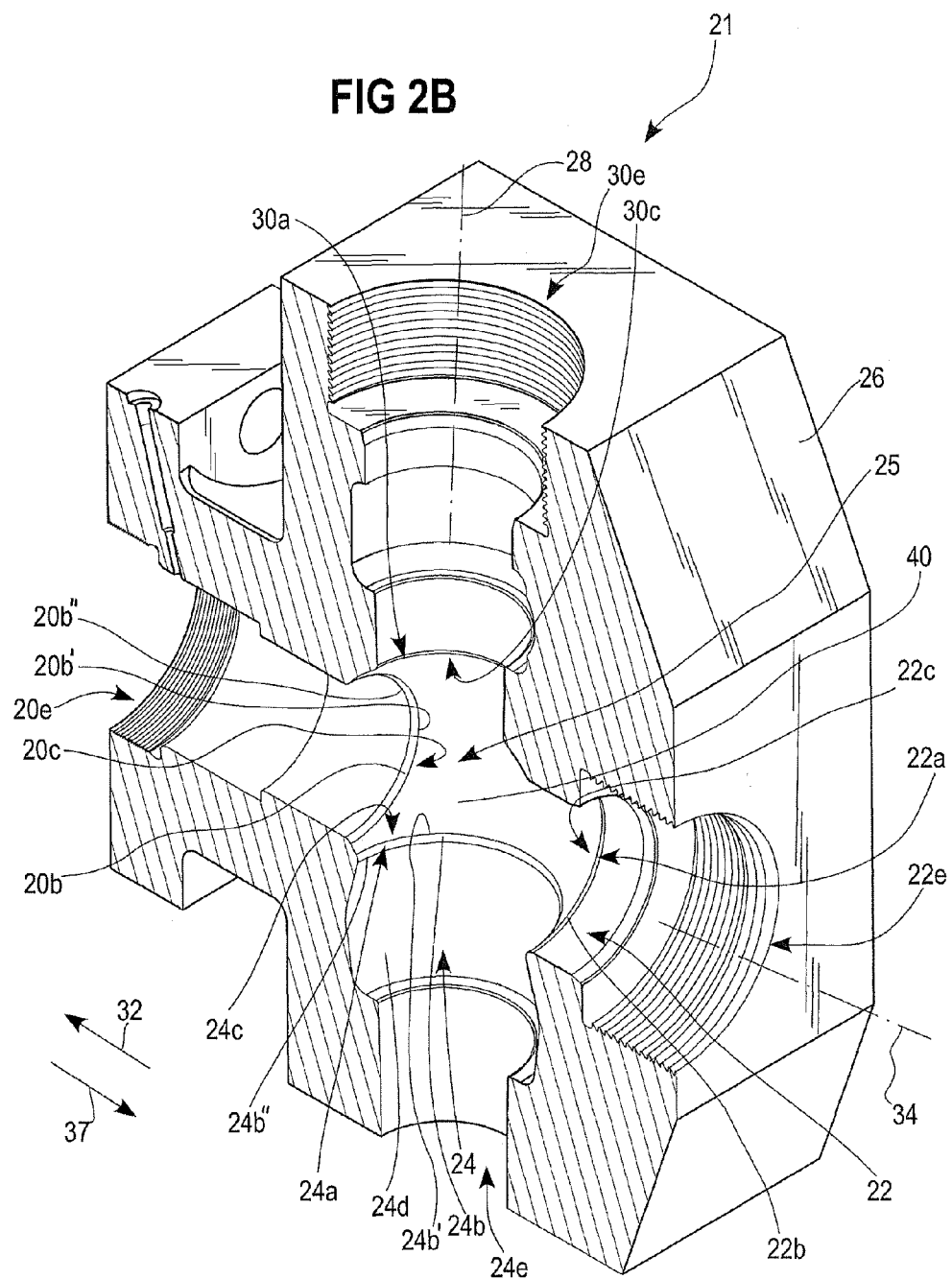
FIG. 2B is an isometric sectional view of the fluid end of FIG. 2A taken along the same section line except looking in an axially opposite direction along the axis of the plunger bore as compared to the direction of FIG. 2A.

In more detail, the end 20c is as close as possible, in the axial direction, relative to long axis 18, to the cross-bore intersection 25. The transition open area 20a is axially opposite an entry open end 20e opening into the power end bore 20 through a portion of an external surface 26 of the fluid end 21. The path formed by transition surface 20b is continuous and circumscribes long axis 18. The circular path formed by the transition surface 20b completely lies in a single plane wherein the plane is perpendicular to the long axis 18. The circular path is thus planar. The transition surface 20b is delimited in a direction going towards entry open end 20e from the transition open area 20a, by edge 20b''. The edge 20b'' forms an end of bore 20 which opens into transition open area 20a. The transition surface 20b, between edges 20b' and 20b'', going in a direction from the power end bore 20 towards the cross-bore intersection, is rounded and convex. The transition surface could be chamfered in which case it would be conical. The transition surface is uniform. It has a constant and continuous width measured as the axial distance, relative to long axis 18, between edges 20b'' and 20b'. It has a constant and continuous height measured as the radial distance from edge 20b'' to a line parallel to long axis 18 and the line intersecting a peak of the rounded surface 20b. The edges 20b' and 20b'' are parallel to each other. Each edge 20b' and 20b'' respectively is circumferential, continuous and circumscribes long axis 18. Each edge also respectively forms and traces a circular and continuous path. The paths each lie completely in a respective plane. The planes in which each edge 20b', 20b'' lie are also perpendicular to axis 18. The paths formed by edges 20b', 20b'' are thus planar. The edge 20b' circumscribes end 20c. The edge 20b' is at the place where surface 20b joins a portion of surface 40 forming the cross-bore intersection outer boundary. The edge 20b' is the last edge crossed along a path starting in power end bore 20 and ending once the path enters the cross-bore intersection 25. The direction of the path is towards the cross-bore intersection 25. Similarly the edge 20b' is the first edge crossed along a path starting in the cross-bore intersection 25 and ending in the power end bore 20. The direction of the path is towards the bore 20 from cross-bore intersection 25. The edge 20b' is the last edge, going in the direction towards the cross-bore intersection 25 from the power end bore 20, which is between cross-bore intersection 25 and the power end bore 20. The edge 20b" is at the place where cylindrical counter bore surface 20d joins transition surface 20b. The cylindrical counter bore surface 20d delimits the power end bore 20 in the radial direction relative to the long axis 18. The circumferential nature of the surface 20b and edges 20b', 20b" can best be seen in FIGS. 2B, 2D and 2E.

A transition surface 30b, delimits in the radial direction, relative to long axis 28 of discharge bore 30, transition open area 30a. Transition surface 30b is axially between, relative to long axis 28, cylindrical counter bore 30d and a portion of internal surface 40. The transition surface 30b circumscribes long axis 28 of bore 30. The transition surface 30b is circumferential and continuous. The transition surface forms and traces a circular path. The path formed by transition surface 30b is continuous and circumscribes long axis 28. The circular path formed by the transition surface 30b completely lies in a single plane wherein the plane is perpendicular to the long axis 28. The circular path is thus planar. Transition surface 30b is delimited, in a direction going towards the cross-bore intersection 25 from the transition open area 30a, by an edge 30b'. The edge 30b' is at an end 30c of transition open area 30a. The end 30c of the transition open area delimits the opening into the cross bore intersection 25 going in the axial direction, relative to long axis 28, towards the cross-bore intersection 25. The end 30c is as close as possible, in the axial direction, relative to long axis 28, to the cross-bore intersection 25. The transition open area 30a is axially opposite an entry open end 30e opening into the discharge bore 30 through a portion of an external surface 26 of the fluid end 21. The transition surface 30b is delimited, in a direction going towards entry open end 30e from the transition area 30a, by edge 30b". The edge 30b" forms an end of bore 30 which opens into transition open area 30a.

The transition surface 30b, between edges 30b' and 30b", going in a direction from the discharge bore 30 towards the cross-bore intersection, is rounded and convex. The transition surface could be chamfered in which case it would be conical. The transition surface is uniform. It has a constant and continuous width measured as the axial distance, relative to long axis 28, between edges 30b" and 30b'. It has a constant and continuous height measured as the radial distance from edge 30b" to a line parallel to long axis 28 and the line intersecting a peak of the rounded surface 30b. The edges 30b' and 30b" are parallel to each other. Each edge 30b' and 30b" respectively is circumferential, continuous, and circumscribes long axis 28. Each edge also respectively forms and traces a circular and continuous path. The paths each lie completely in a respective plane. The planes in which each edge 30b', 30b" lie are also perpendicular to axis 28. The paths formed by edges 30b', 30b" are thus planar. The edge 30b' circumscribes end 30c. The edge 30b' is at the place where surface 30b joins a portion of surface 40 forming the cross-bore intersection outer boundary. The edge 30b' is the last edge crossed along a path starting in discharge bore 30 and ending once the path enters the cross-bore intersection 25. The direction of the path is towards the cross-bore intersection 25. Similarly the edge 30b' is the first edge crossed along a path starting in the cross-bore intersection 25 and ending in the discharge bore 30. The direction of the path is towards the bore 30 from cross-bore intersection 25. The edge 30b' is the last edge, going in the direction towards the cross-bore intersection 25 from the discharge bore 30, which is between cross-bore intersection 25 and the discharge bore 30. The edge 30b" is at the place where cylindrical counter bore surface 30d joins transition surface 30b. The cylindrical counter bore surface 30d delimits the discharge bore 30 in the radial direction relative to the long axis 28. The circumferential nature of the surface 30b and edges 30b', 30b" can best be seen in FIGS. 2C, 2D and 2E.

A transition surface 24b delimits, in the radial direction, relative to long axis 36 of suction bore 24, transition open area 24a. Transition surface 24b is axially between, relative to long axis 36, cylindrical counter bore 24d and a portion of internal surface 40. The transition surface 24b circumscribes long axis 36 of bore 24. The transition surface 24b is circumferential and continuous. The transition surface forms and traces a circular path. The path formed by transition surface 24b is continuous and circumscribes long axis 36. The circular path formed by the transition surface 24b completely lies in a single plane wherein the plane is perpendicular to the long axis 36. The circular path is thus planar. Transition surface 24b is delimited, in a direction going towards the cross-bore intersection 25 from the transition open area 24a, by an edge 24b'. The edge 24b' is at an end 24c of transition open area 24a. The end 24c of the transition open area delimits the opening into the cross bore intersection 25 going in the axial direction, relative to long axis 36, towards the cross-bore intersection 25. The end 24c is as close as possible, in the axial direction, relative to long axis 36, to the cross-bore intersection 25. The transition open area 24a is axially opposite an entry open end 24e opening into the suction bore 24 through a portion of an external surface 26 of the fluid end 21. The transition surface 24b is delimited, in a direction going towards entry open end 24e from the transition open area 24a, by edge 24b". The edge 24b" forms an end of bore 24 which opens into transition open area 24a.

The transition surface 24b, between edges 24b' and 24b", going in a direction from the suction bore 24 towards the cross-bore intersection, is rounded and convex. The transition surface could be chamfered in which case it would be conical. The transition surface is uniform. It has a constant and continuous width measured as the axial distance, relative to long axis 36, between edges 24b" and 24b'. It has a constant and continuous height measured as the radial distance from edge 24b" to a line parallel to long axis 36 and the line intersecting a peak of the rounded surface 24b. The edges 24b' and 24b" are parallel to each other. Each edge 24b' and 24b" respectively is circumferential, continuous, and circumscribes long axis 36. Each edge also respectively forms and traces a circular and continuous path. The paths each lie completely in a respective plane. The planes in which each edge 24b', 24b" lie are also perpendicular to axis 36. The paths formed by edges 24b', 24b" are thus planar. The edge 24b' circumscribes end 24c. The edge 24b' is at the place where surface 24b joins a portion of surface 40 forming the cross-bore intersection outer boundary. The edge 24b' is the last edge crossed along a path starting in suction bore 24 and ending once the path enters the cross-bore intersection 25. The direction of the path is towards the cross-bore intersection 25. Similarly the edge 24b' is the first edge crossed along a path starting in the cross-bore intersection 25 and ending in the suction bore 24. The direction of the path is towards the bore 24 from cross-bore intersection 25. The edge 24b' is the last edge, going in the direction towards the cross-bore intersection 25 from the suction bore 24, which is between cross-bore intersection 25 and the suction bore 24. The edge 24b" is at the place where cylindrical counter bore surface 24d joins transition surface 24b. The cylindrical counter bore surface 24d delimits the suction bore 24 in the radial direction relative to the long axis 36. The circumferential nature of the surface 24b and edges 24b', 24b" can best be seen in FIGS. 2A, 2B, 2C, 2D and 2E.

The cross-bore intersection 25 has a spherical geometry. Internal surface 40 of the fluid end has a spherical geometry. The phrase spherical geometry describes that the surface 40 conforms to an outline forming a sphere. The surface 40 delimits the outer boundary of the cross-bore intersection 25, and the only discontinuities in the surface 40 are at transition open areas 20a, 22a, 24a, and 30a. Within the outer boundary is open space 41. The surface 40 delimits the entire outer boundary of the cross-bore intersection 25. The entire surface 40 has a spherical geometry, which can also be called a spherical contour, conforming to an outline of a sphere having a center point in the cross-bore intersection 25. The center point 44 is located at a single point where the plunger bore long axis 18, the discharge bore long axis 28, and the suction bore long axis 36 intersect. The spherical contour of the surface 40 can be seen in FIGS. 2A-2D and FIG. 3B. The circle formed by dashed lines 42 in FIG. 2E exemplifies the sphere outline to which the surface 40 conforms.

More generally, the power end bore 20 and access bore 22 are at least partially aligned. The suction bore 24 and discharge bore 30 are aligned and lie substantially orthogonal to the power end bore 20 and access bore 22. The long axis 18 of the power end bore 20 extends through the transition open area 22a. The long axis 28 of the discharge bore 30 extends through the transition open area 24a. The axis 18 of the power end bore 20 is perpendicular to the axis 36 of the suction bore 24 and axis 28 of the discharge bore 30. The long axes 18, 28, and 36 all intersect at single point 44. The fluid end 21 is a component of a reciprocating pump that uses a plunger (not shown in this figure) to move fluid. As the plunger reciprocates in bore 20 in a first direction 32 away from the access bore 22, fluid enters the suction bore 24 through a fluid inlet. A suction valve (not shown), normally in the closed position, opens to allow fluid into the cross-bore intersection 25. The plunger then reciprocates in the opposite second direction 37 along the long axis 18 of the bore 20. The reciprocation causes the fluid to exit the fluid end 21 from the discharge bore 30. The fluid exits the discharge bore 30 by first passing over a discharge valve, normally in the closed position, but which opens as the fluid passes over the valve. Although a fluid end used with a plunger is shown, the above description applies to a fluid end used with a piston. The piston operates with the power end bore 20 but does not extend into the power end bore 20. The piston is in fluid communication with the power end bore 20 via a cylinder which extends from the entry end of the power end bore 20.

The spherical cross-bore geometry and circumferential transition surfaces and edges of the present invention can be created and machined through the use of conventional Computer Numerical Control ("CNC") milling equipment. CNC equipment can be programmed to create virtually identical replicas of a design. Further, CNC machines do not require the same level of skill that a manual milling or grinding machine would require to produce the geometries of the prior art. Therefore the present invention excludes the need to manually blend the edges within the cross-bore intersection through the use of manual grinding or requiring specialized equipment.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A fluid end of a pump comprising:
   a power end bore formed in a portion of said fluid end, said power end bore having a long axis;
   a first transitional open area which opens into a cross-bore intersection from said power end bore, said transitional open area is axially opposite, relative to the power end bore long axis, an entry open end opening into the power end bore through a portion of an external surface of the fluid end, a first transitional surface delimits in the radial direction, relative to the power end bore long axis, said first transitional open area, said cross-bore intersection formed in a portion of said fluid end;
   a discharge bore formed in a portion of said fluid end, said discharge bore having a long axis;
   a second transitional open area which opens into the cross-bore intersection from said discharge bore, said second transitional open area is axially opposite, relative to the discharge bore long axis, an entry open end opening into the discharge bore through a portion of said external surface of the fluid end, a second transitional surface delimits, in the radial direction, relative to the discharge bore long axis, said second transitional open area;
   a suction bore formed in a portion of said fluid end, said suction bore having a long axis;
   a third transitional open area which opens into the cross-bore intersection from said suction bore, said transitional open area is axially opposite, relative to the suction bore long axis, an entry open end opening into the suction bore through a portion of said external surface of the fluid end, a third transitional surface delimits, in the radial direction, relative to the suction bore long axis, said third transitional open area;
   an access bore formed in a portion of said fluid end, said access bore having a long axis;
   a fourth transitional open area which opens into the cross-bore intersection from said access bore, said transitional open area is axially opposite, relative to the access bore long axis, an entry open end opening into the access bore through a portion of said external surface of the fluid end, a fourth transitional surface delimits, in the radial direction, relative to the access bore long axis, said fourth transitional open area;
   an internal surface delimiting an outer boundary of said cross-bore intersection, and an open space is formed within said outer boundary, said internal surface has a spherical geometry conforming to an outline of a sphere, said sphere having a center point in said cross-bore intersection; and
   wherein the long axis of the discharge bore extends through the transitional open area of said suction bore.

2. The fluid end of claim 1 wherein the first transition surface forms and traces a circular path.

3. The fluid end of claim 2 wherein the circular path is continuous.

4. The fluid end of claim 3 wherein the circular path completely lies in a single plane, wherein the plane is perpendicular to the power end bore long axis.

5. The fluid end of claim 4 wherein the first transition surface is delimited, in a direction going towards the cross-bore intersection from the first transitional open area, by a first edge.

6. The fluid end of claim 5 wherein the first transition surface is delimited, in a direction going towards the power end bore entry open end from the first transitional open area by a second edge.

7. The fluid end of claim 6 wherein the first transition surface has a constant and continuous width measured as an axial distance, relative to the power end bore long axis, between the first edge and the second edge.

8. The fluid end of claim 7 wherein the fourth transition surface forms and traces a circular path.

9. The fluid end of claim 8 wherein the circular path of the fourth transition surface is continuous.

10. The fluid end of claim 9 wherein the circular path of the fourth transition surface completely lies in a single plane, wherein the plane is perpendicular to the access bore long axis.

11. The fluid end of claim 10 wherein the fourth transition surface is delimited, in a direction going towards the cross-bore intersection from the fourth transitional open area, by a first edge.

12. The fluid end of claim 11 wherein the fourth transition surface is delimited, in a direction going towards the access bore entry open end from the fourth transitional open area by a second edge.

13. The fluid end of claim 12 wherein the fourth transition surface has a constant and continuous width measured as an axial distance, relative to the access bore long axis, between the first edge and the second edge delimiting the fourth transition surface.

14. The fluid end of claim 5 wherein the first edge forms and traces a circular and continuous path, said path lies completely in a single plane, wherein the plane is perpendicular to the power end bore long axis.

15. The fluid end of claim 14 wherein the first edge is a last edge crossed along a path starting in power end bore and ending once the path enters the cross-bore intersection, and wherein the path is in a direction towards the cross-bore intersection.

16. The fluid end of claim 14 wherein the first edge is a first edge encountered along a path starting in the cross-bore intersection and going into power end bore, and wherein the path is in a direction towards the power end bore.

17. The fluid end of claim 11 wherein the first edge delimiting the fourth transition surface forms and traces a circular and continuous path, the path completely lies in a single plane, wherein the plane is perpendicular to the access bore long axis.

18. The fluid end of claim 17 wherein the first edge delimiting the fourth transition surface is a last edge crossed along a path starting in the access bore and ending once the path enters the cross-bore intersection, and wherein the path is in a direction towards the cross-bore intersection.

19. The fluid end of claim 17 wherein the first edge delimiting the fourth transition surface is a last edge, going in a direction towards the cross-bore intersection from the access bore, which is between the cross-bore intersection and the access bore.

20. The fluid end of claim 1 wherein, each of the first transitional surface, the second transitional surface, the third transitional surface, and the fourth transitional surface cooperate to at least partially define the outline of the sphere and each of the first transitional surface, the second transitional surface, the third transitional surface, and the fourth transitional surface completely resides on the outline of the sphere.

21. A fluid end of a pump comprising:
a power end bore formed in a portion of said fluid end, said power end bore having a long axis;
a first transitional open area which opens into a cross-bore intersection from said power end bore, said transitional open area is axially opposite, relative to the power end bore long axis, an entry open end opening into the power end bore through a portion of an external surface of the fluid end, a first transitional surface delimits in the radial direction, relative to the power end bore long axis, said first transitional open area, said cross-bore intersection formed in a portion of said fluid end;
a discharge bore formed in a portion of said fluid end, said discharge bore having a long axis;
a second transitional open area which opens into the cross-bore intersection from said discharge bore, said second transitional open area is axially opposite, relative to the discharge bore long axis, an entry open end opening into the discharge bore through a portion of said external surface of the fluid end, a second transitional surface delimits, in the radial direction, relative to the discharge bore long axis, said second transitional open area;
a suction bore formed in a portion of said fluid end, said suction bore having a long axis;
a third transitional open area which opens into the cross-bore intersection from said suction bore, said third transitional open area is axially opposite, relative to the suction bore long axis, an entry open end opening into the suction bore through a portion of said external surface of the fluid end, a third transitional surface delimits in the radial direction, relative to the suction bore long axis, said third transitional open area;
an internal surface delimiting an outer boundary of said cross-bore intersection, and an open space is formed within said outer boundary, said internal surface has a spherical geometry conforming to an outline of a sphere, said sphere having a center point in said cross-bore intersection; and
wherein the long axis of the discharge bore extends through the transitional open area of said suction bore.

22. A fluid end of a pump comprising:
a pump body;
a first transitional surface defining the end of a first bore, the first bore extending along a first axis;
a second transitional surface defining the end of a second bore, the second bore extending along the first axis;
a third transitional surface defining the end of a third bore, the third bore extending along a second axis that is normal to and intersects the first axis to define a center of a cross-bore intersection defined by a cross-bore surface; and
a fourth transitional surface defining the end of a fourth bore, the fourth bore extending along the second axis, wherein the first transitional surface, the second transitional surface, the third transitional surface, and the fourth transitional surface cooperate to define a sphere, and wherein the cross-bore surface resides on that sphere.

* * * * *